Figure 1:
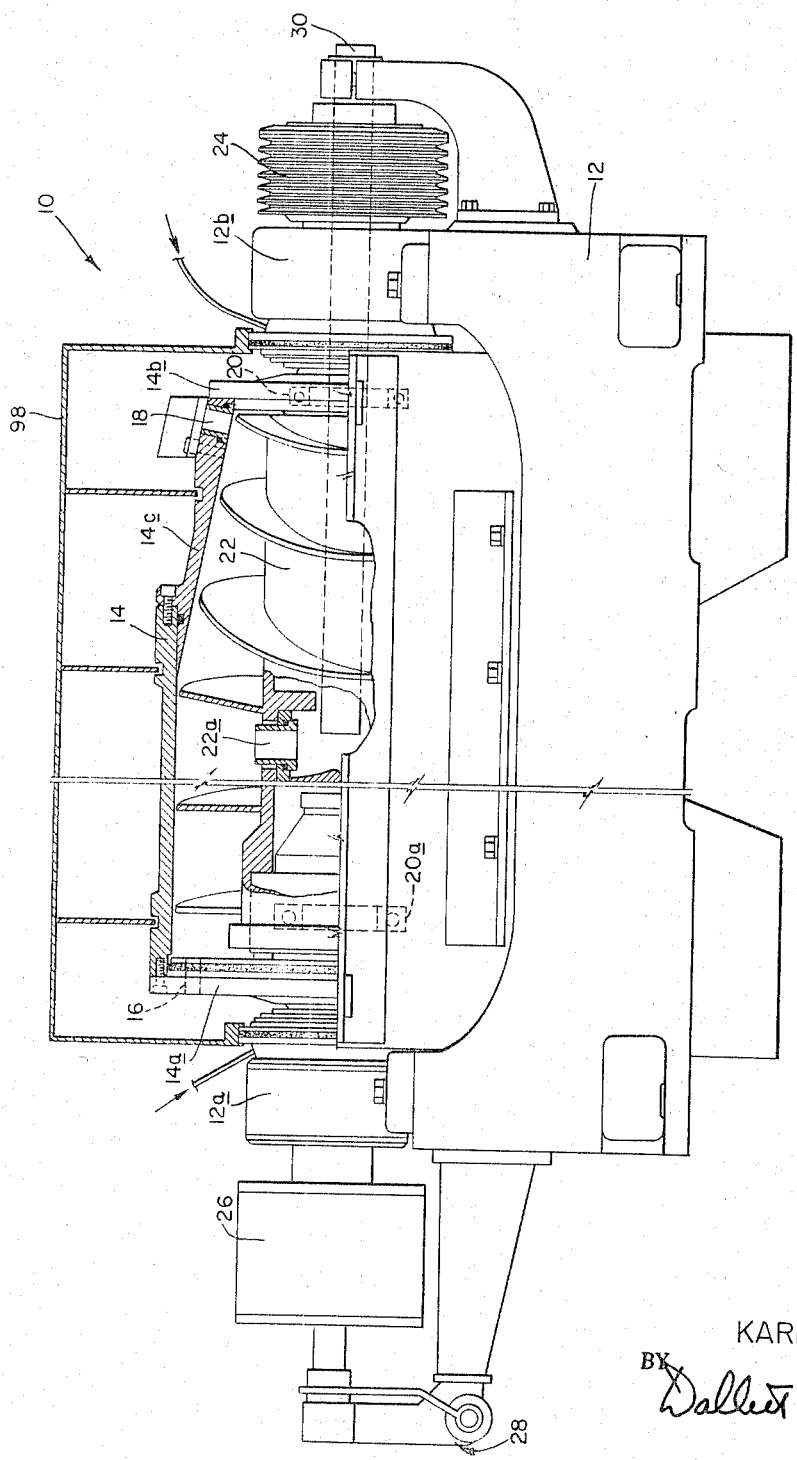

April 25, 1967 K. G. REED 3,315,882
CENTRIFUGE HAVING ROTARY SOLIDS DISCHARGE CONVEYOR
WITH BEARING SEAL
Filed Oct. 5, 1964 2 Sheets-Sheet 1

INVENTOR.
KARL G. REED
BY Dallett Hoopes
ATTORNEY

INVENTOR.
KARL G. REED
ATTORNEY

United States Patent Office 3,315,882
Patented Apr. 25, 1967

3,315,882
CENTRIFUGE HAVING ROTARY SOLIDS DISCHARGE CONVEYOR WITH BEARING SEAL
Karl G. Reed, Wayne, Pa., assignor to Pennsalt Chemicals Corporation, Philadelphia, Pa., a corporation of Pennsylvania
Filed Oct. 5, 1964, Ser. No. 401,383
4 Claims. (Cl. 233—7)

This invention relates to centrifuges. More particularly this invention relates to centrifuges especially adapted for operation on process streams having process atmospheres including dust solids and/or vapors harmful to bearings and/or bearing lubricants. The invention provides means for sealing such atmospheres from the centrifuge bearings.

It is conventional in the separation of solids from a liquid-solids mixture to employ a centrifuge of the "worm" type comprising a solid bowl mounted to rotate about an axis and having liquid and solids discharge openings at its opposite ends, respectively. Within the bowl a helical conveyor is mounted on the axis and adapted in rotating at a speed different from the speed of the bowl to move settled solids to the solids discharge opening for discharge therethrough. In the structure of such centrifuges, it is conventional to journal the helical conveyor in the bowl ends in sleeve or ball or roller bearing assemblies. Such assemblies, of course, require lubrication. This is conventionally supplied as grease through a passage in the bowl shaft connected to a pressure fitting outside the bowl. An example of such a lubrication arrangement is disclosed in the U.S. Patent 2,679,974 which issued on an application filed by F. P. Gooch.

Such prior art arrangements have serious drawbacks in the processing of feed streams with atmospheres which if permitted to reach the bearings may abrade the bearings or leach out bearing lubricants and cause the bearings to run dry and freeze. At first blush it would appear that the problem could be easily met by the provision of a conventional seal between the interior of the centrifuge bowl and the bearing area. Experience, however, has shown this to be far from the case. The use of a mechanical seal, for instance a rigid-faced carbon seal, has been found unsatisfactory because there is normally some leakage therethrough, and bearing grease will break the seal further and permit process atmospheres to penetrate into the bearing area. On the other hand, lip-type seals of elastomeric composition while effective at retaining grease, are poor in operation in the presence of some solvent vapors which attack the elastomer to cause swelling and leakage.

The present invention, developed after considerable experiment and thought, combines the use of both the rigid-faced mechanical seal and the lip-type elastomeric seal. The two types of seals are used in such a way in the present arrangement as to preclude manifestation of their respective weaknesses.

It is, therefore, an object of this invention to provide for a centrifuge seal means which keep process atmospheres within the centrifuge bowl from penetrating into the conveyor bearing area to cause bearing abrasion or leaching out of the bearing lubricant.

Figure 2:
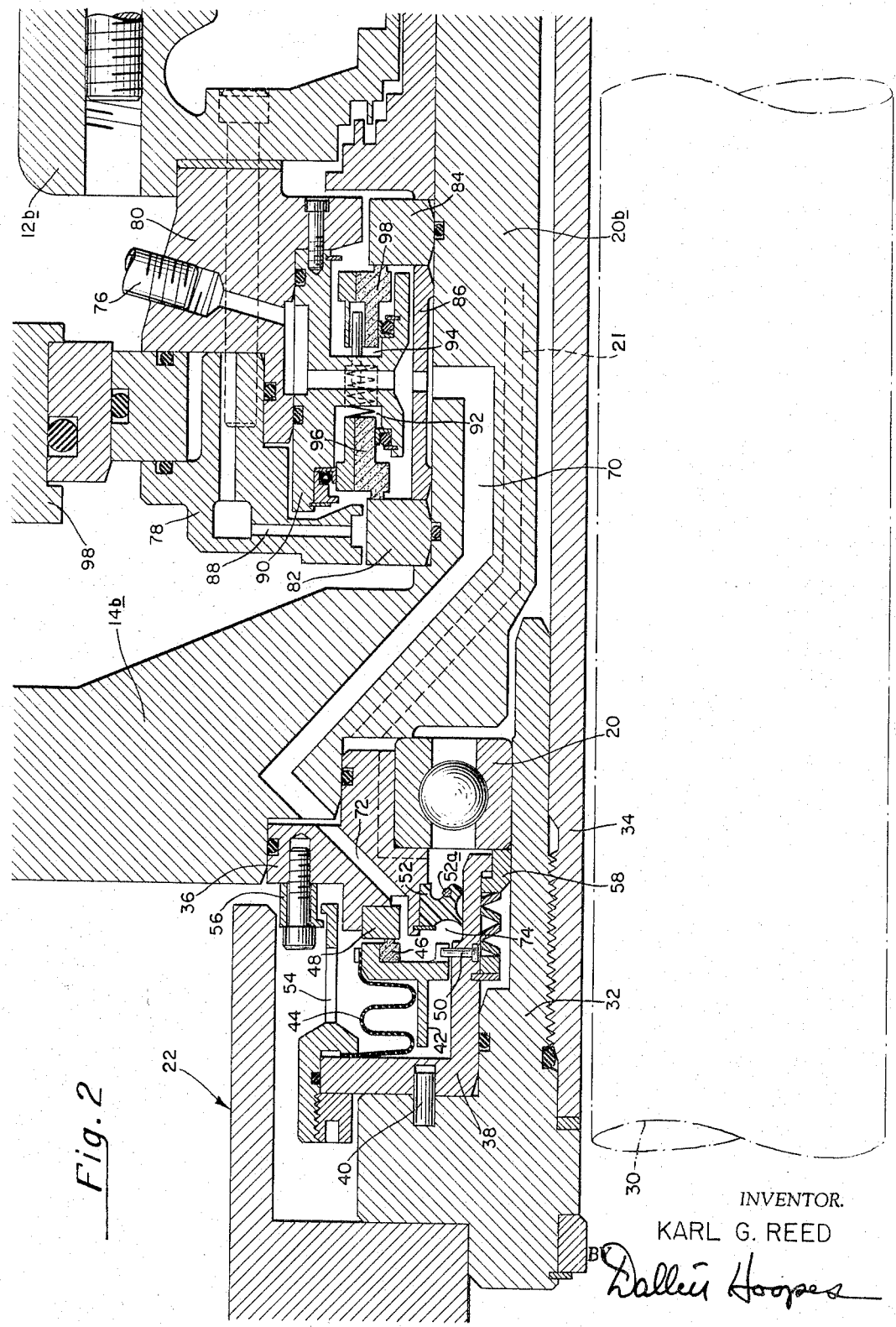

Other objects and features of the invention will be apparent from reference to the following specification describing an embodiment of the invention and the drawings wherein:

FIGURE 1 is a broken elevational view, partly in section of a centrifuge embodying the invention; and FIGURE 2 is an enlarged fragmentary sectional view of the portion of FIGURE 1 adjacent the rightward conveyor bearing.

Briefly, the invention provides means to keep centrifuge process atmosphere including dust and vapors from the conveyor bearings and comprises a rigid-faced mechanical seal adjacent the centrifuge compartment and an elastomeric seal between the mechanical seal and the bearing area and means to provide under pressure an inert gas blanket between the two seals.

Referring more specifically to the drawings, FIGURE 1 shows in broken length a centrifuge embodying the invention and generally designated 10. It comprises a frame 12 having main bearings 12a and 12b in which are journaled a solid centrifuge bowl 14 adapted for rotation about an axis. A liquid discharge opening 16 is provided in one end hub 14a of the bowl 14 and a solids discharge opening 18 is provided adjacent the other end hub 14b. A beach portion 14c inclines inwardly toward the solids discharge opening 18.

Mounted in ball or roller bearings 20 secured in the hubs in the solid bowl 14 is conveyor 22. In operation the bowl is rotated by drive means operatively connected to the pulley 24. The rotation of the bowl 14 is transmitted to a gear box 26 the output from which is conducted through a spline shaft within the bowl shaft to the conveyor 22. As is conventional stationary torque control means 28 hold the gear box pinion from rotation.

The process feedstream is delivered to the centrifuge through feed tube 30 and feed opening 22a in the conveyor 22.

Referring now to FIGURE 2, the rightward conveyor bearing 20 is shown in greater detail. The centrifuge conveyor 22 has secured thereto a mounting sleeve 32 which engages the inner race of the bearing assembly. The sleeve 32 links the conveyor 22 with the tension element 34 which functions in accordance with the description of U.S. Patent 3,148,145 which issued Sept. 8, 1964. Both the sleeve 32 and the tension element 34 circumpose the feed tube 30. The bowl 14b has secured to it a bearing mount ring 36 which engages the outer race of the bearing assembly 20. The mounting sleeve 32 carries a seal base ring 38 which is pinned to the sleeve 32 at 40. A reciprocal mechanical seal holder ring 42 is sealingly connected to the base ring 38 by the bellows 44 which may be of plastic such as polytetrafluoroethylene and a mechanical seal ring 46 has a rigid annular face which sealingly engages a mating ring 48 having a hardened surface with a polished face and disposed on the bearing mount ring 36. A pin 50 in base ring 38 assures rotation of the holder ring 42 with the conveyor.

The bearing mount ring 36 carries a lip-type elastomer seal 52 which engages an outward peripheral surface on the base ring 38. Preferably the lip-type seal 52 is a "Clipper" seal and its elastomeric properties cause it to snugly engage the sealing surface. As shown the side of the lip-type seal 52 adjacent the mechanical seal 46, 48 is feathered to provide an inclined surface against which fluid pressure may act to assure a seal. Additionally a resilient ring 52a fits in an annular groove about the other side of the lip-type seal 52 to urge it into engagement with the seal surface assembly 38. Thus the seals 46, 48 and 52 stand in the path of vapors which would move from the centrifuging area to the bearing area.

As shown lubrication may be supplied to the bearing 20 by passage 21 through the hub shaft 20b.

To serve as a partial barrier against intrusion of dust into the seal area, and to protect the bellows 44, interfitting guard rings 54 and 56 are mounted on the seal base ring 38 and the bearing mount ring 36, respectively. The guard rings 54 and 56, as well as the biased retainer ring 58, hold the various elements in place during disassembly. The retainer ring also prestresses the thrust bearing within pulley 24 in accordance with U.S. 3,148,145.

An inert gas passage 70 through the hub shaft 20b and hub 14b communicates with a passage 72 in the bearing mount ring 36 to supply gas under pressure to a chamber 74 defined by the mechanical seal 46, 48, the lip-type seal 52, the conveyor assembly, and the hub assembly. In operation the pressure in the chamber 74 may only be of the order of five pounds per square inch above atmosphere. Preferably the gas is of an inert character or at least of a character which will not react with the gases in the process.

The rightward portion of FIGURE 2 discloses a preferred means for communicating the gas from the fixed supply tube 76 to passage 70 in the rotating shaft 20b. As shown the joint comprises an annular two-piece housing 78 and 80, the latter piece of which engages the main centrifuge bearing 12b. As shown the two pieces of the housing are bolted together and are appropriately sealed by O-rings. The two pieces are spaced about the shaft 20 seal rings 82 and 84, sealed to the hub shaft 20b. The rings are spaced from each other by a spacing liner 86 which is suitably apertured as shown. If process conditions warrant a flush may be conducted through passage 88 in the housing to cool and keep process solids from the ring 82. Within an annular cavity in the two-part housing 78, 80 is the seal ring assembly comprising the annular unit 90. The annular unit 90 presents opposing deep pockets 92 and 94 which respectively receive movable mechanical seal elements 96 and 98 spring biased against the shaft seals 82 and 84, respectively. Suitable O-rings and other minor seals may be provided as indicated. The periphery of the two-part housing 78, 80 is provided with a pocket and sealingly receives the margin of an opening in the centrifuge casing 98.

It should be understood that the FIGURE 2 embodiment represents specific possible structure surrounding the rightward bearing 20 as shown in FIGURE 1. Comparable structure may surround the bearing 20a as shown in the leftward position in FIGURE 1. Further, the invention may be embodied in a machine operating about a vertical axis as illustrated in U.S. Patent 3,061,181, issued Oct. 30, 1962.

Arrangements comparable to that indicated in FIGURE 2 are capable of exemplary performance under severe processing conditions. By supplying a small blanket of inert gas to chamber 74 between the seals penetration by the process atmosphere into the bearing area is avoided. It may be understood that with the provision of, for instance, five pounds per square inch in the chamber 74 some gas will leak through the mechanical seal 46, 48 to block entry of the process atmosphere in the reverse direction. This keeps the process vapors from contacting the elastomer of the lip-type seal 52 and keeps the latter in operative shape. Because of this the bearing grease is not permitted past the seal 52 into the chamber 74 where it might otherwise vitiate the mechanical seal 46, 48. Hence the weak points of the respective seals are not given a chance to manifest themselves. The mechanical seal 46, 48 is not exposed to bearing grease and the elastomeric seal 52 is held apart from process vapors which would otherwise cause it to become misshapen.

For purposes of convenience in the claims the term "bowl assembly" is used to indicate elements rotating with the bowl, and "conveyor assembly" is used to indicate elements rotating with the conveyor.

It should be understood that variations are possible within the scope of the invention. Therefore, having particularly described my invention, it is to be understood that this is by way of illustration, and that changes, omissions, additions, substitutions, and/or other modifications may be made without departing from the spirit of the invention. Accordingly, it is intended that the patent shall cover, by suitable expression in the claims, the various features of patentable novelty that reside in the invention.

I claim:
1. A centrifuge comprising
   (a) a bowl assembly mounted to rotate about an axis,
   (b) a conveyor assembly comprising a helical conveyor element and disposed within the bowl assembly,
   (c) lubrication-requiring bearing means mounting the conveyor assembly within the bowl assembly for rotation relative thereto, process vapors in the bowl tending to follow a path to reach the bearing means,
   (d) rigid-faced sealing means sealingly held on one of said assemblies and resiliently biased into sealing engagement with the other assembly, said rigid-faced sealing means being disposed on the path intermediate said helical conveyor element and said bearing means,
   (e) elastomeric sealing means sealingly held on one of said assemblies and having its distal periphery sealingly engaging the other assembly, the elastomeric sealing means being disposed on the path intermediate the rigid-faced sealing means and the bearing means, the rigid-faced sealing means and the elastomeric sealing means together with the conveyor assembly and the bowl assembly defining a chamber, and
   (f) means for supplying a gas under pressure to said chamber.

2. A centrifuge as described in claim 1 wherein said elastomeric sealing means has a distal portion which is feathered toward the chamber.

3. A centrifuge comprising a hollow bowl adapted to rotate about an axis, a screw conveyor disposed within the bowl and on the axis and mounted in bearings requiring lubrication, seal means disposed between the interior of the bowl and one of the bearings, the seal means comprising an elastomer seal adjacent the bearing and a mechanical seal on the opposite side of said elastomer seal from the bearing, and means for introducing a gas under pressure between said mechanical seal and said elastomer seal.

4. A centrifuge as described in claim 3 wherein the elastomer seal is a lip-type seal and has a lip which tends to seal more tightly when acted against by said pressure.

References Cited by the Examiner

UNITED STATES PATENTS

| 2,273,129 | 2/1942 | Messinger | 277—59 |
| 2,943,453 | 7/1960 | Jonkers et al. | 277—65 X |
| 3,148,145 | 9/1964 | Reed | 233—7 |
| 3,194,492 | 7/1965 | Koffinke et al. | 233—7 |

FOREIGN PATENTS

| 1,330,862 | 5/1963 | France. | |

M. CARY NELSON, *Primary Examiner.*

HENRY T. KLINKSIEK, *Examiner.*